United States Patent
Li et al.

(10) Patent No.: US 10,712,611 B2
(45) Date of Patent: Jul. 14, 2020

(54) DISPLAY DEVICE, DISPLAY APPARATUS AND DISPLAY METHOD

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN); Qian Wang, Beijing (CN); Ming Yang, Beijing (CN); Chen Yu Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 84 days.

(21) Appl. No.: 15/779,712

(22) PCT Filed: Oct. 26, 2017

(86) PCT No.: PCT/CN2017/107863
§ 371 (c)(1),
(2) Date: May 29, 2018

(87) PCT Pub. No.: WO2018/166209
PCT Pub. Date: Sep. 20, 2018

(65) Prior Publication Data
US 2019/0294001 A1    Sep. 26, 2019

(30) Foreign Application Priority Data
Mar. 17, 2017    (CN) .......................... 2017 1 0161143

(51) Int. Cl.
*G02F 1/1335*    (2006.01)
*G02F 1/13357*    (2006.01)
(Continued)

(52) U.S. Cl.
CPC ...... *G02F 1/133606* (2013.01); *G02F 1/1393* (2013.01); *G02F 1/13306* (2013.01);
(Continued)

(58) Field of Classification Search
CPC .................................................. G02F 1/133606
See application file for complete search history.

(56) References Cited

U.S. PATENT DOCUMENTS

2006/0262054 A1* 11/2006 Yamazaki ............... G09G 3/20
345/77
2006/0279843 A1* 12/2006 Kurt ..................... G02B 5/1847
359/558
(Continued)

FOREIGN PATENT DOCUMENTS

CN    203365807 U    12/2013
CN    103544921 A    1/2014
(Continued)

OTHER PUBLICATIONS

International Search Report and Written Opinion dated Feb. 5, 2018.

*Primary Examiner* — Sang V Nguyen
(74) *Attorney, Agent, or Firm* — Dilworth & Barrese, LLP.; Michael J. Musella, Esq.

(57) ABSTRACT

A display device, a display apparatus and a display method are provided, the display device includes: a backlight source module; a display module; and a liquid crystal grating structure, arranged between the backlight source module and the display module.

17 Claims, 3 Drawing Sheets

(51) Int. Cl.
*G02F 1/13363* (2006.01)
*G02F 1/139* (2006.01)
*G02F 1/133* (2006.01)
*G02F 1/29* (2006.01)
*G02F 1/1343* (2006.01)

(52) U.S. Cl.
CPC .... *G02F 1/13363* (2013.01); *G02F 1/133504* (2013.01); *G02F 1/134309* (2013.01); *G02F 1/29* (2013.01)

(56) References Cited

U.S. PATENT DOCUMENTS

| | | | | |
|---|---|---|---|---|
| 2010/0265435 | A1* | 10/2010 | Hwang | G02F 1/1323 349/64 |
| 2014/0009377 | A1* | 1/2014 | Shibazaki | G09G 3/36 345/102 |
| 2014/0293208 | A1* | 10/2014 | Kanbayashi | G02F 1/133502 349/138 |
| 2016/0250552 | A1* | 9/2016 | Dong | A63F 13/52 463/31 |
| 2016/0275875 | A1* | 9/2016 | Wei | G09G 3/3406 |
| 2016/0370921 | A1* | 12/2016 | Huang | G02F 1/134336 |
| 2017/0300152 | A1* | 10/2017 | Ye | G06F 3/0416 |
| 2018/0088438 | A1* | 3/2018 | Wang | G02F 1/292 |

FOREIGN PATENT DOCUMENTS

| | | |
|---|---|---|
| CN | 105589256 A | 5/2016 |
| CN | 105717705 A | 6/2016 |
| CN | 106054423 A | 10/2016 |
| CN | 106249492 A | 12/2016 |
| CN | 205809496 U | 12/2016 |
| CN | 106444175 A | 2/2017 |
| CN | 106647048 A | 5/2017 |
| CN | 106873283 A | 6/2017 |
| KR | 1020080003072 A | 1/2008 |

* cited by examiner

DISPLAY DEVICE, DISPLAY APPARATUS AND DISPLAY METHOD

CROSS-REFERENCE TO RELATED APPLICATION

The present application claims priority of the Chinese Patent Application No. 201710161143.4 filed on Mar. 17, 2017, the disclosure of which is incorporated herein by its reference in its entirety as part of the present application.

TECHNICAL FIELD

Embodiments of the present disclosure relate to a display device, a display apparatus and a display method.

BACKGROUND

Currently, the liquid crystal display technology has become a mainstream display technology in the market, and has been able to meet demands of users in many aspects such as pixel resolution, response time, screen size and the like. However, in some special display environments, special display modes are required to meet special demands of users. For example, in an office environment or in other private environments, a screen needs to be visible only for a user and invisible for other people, which is a peep-proof display mode. For example, in some other cases, the screen needs to be seen by many people, which is a shared display mode.

SUMMARY

According to the embodiments of the disclosure, a display device is provided. The display device comprises: a backlight source module; a display module; and a liquid crystal grating structure, arranged between the backlight source module and the display module.

For example, the liquid crystal grating structure has a divergent mode and a non-divergent mode; in the divergent mode, the liquid crystal grating structure diverges light from the backlight source module; and in the non-divergent mode, the liquid crystal grating structure does not diverge the light from the backlight source module.

For example, the liquid crystal grating structure includes: a lower substrate; a plurality of lower electrodes, arranged in parallel to each other and spaced from each other on an upper surface of the lower substrate; a liquid crystal layer, arranged on the lower substrate and the plurality of lower electrodes; an upper substrate, arranged on the liquid crystal layer; and a plurality of upper electrodes, arranged in parallel to each other and spaced from each other on a lower surface of the upper substrate and corresponding to the plurality of lower electrodes in a one-to-one manner; in the divergent mode, a voltage difference exists between the upper electrodes and the lower electrodes of the liquid crystal grating structure; and in the non-divergent mode, the voltage difference does not exist between the upper electrodes and the lower electrodes of the liquid crystal grating structure.

For example, a distance between any two adjacent lower electrodes is equal, and a distance between any two adjacent upper electrodes is equal.

For example, the distance between any two adjacent lower electrodes is equal to a width of any one of the lower electrodes, and the distance between any two adjacent upper electrodes is equal to a width of any one of the upper electrodes.

For example, a distance between centers of any two adjacent lower electrodes and a distance between centers of any two adjacent upper electrodes are 1.5 to 3.5 micrometers.

For example, the distance between the centers of any two adjacent lower electrodes and the distance between the centers of any two adjacent upper electrodes are 1.5 micrometers.

For example, in the divergent mode, an optical path difference between an electrode region of the liquid crystal grating structure where one of the upper electrodes and one of the lower electrodes are arranged and a non-electrode region of the liquid crystal grating structure where none of the upper electrodes and the lower electrodes is arranged is half of a wavelength of the light from the backlight source module or a sum of half of the wavelength of the light from the backlight source module and integral multiples of the wavelength of the light from the backlight source module.

For example, the liquid crystal layer is formed by electrically controlled birefringence liquid crystals.

For example, the display module includes: an array substrate and an opposed substrate which are arranged oppositely, the array substrate being arranged closer to the liquid crystal grating structure than the opposed substrate; a display liquid crystal layer arranged between the array substrate and the opposed substrate; a lower polarizer arranged on a side of the array substrate which faces away from the opposed substrate; and an upper polarizer arranged on a side of the opposed substrate which faces away from the array substrate; and an extension direction of a long axis of liquid crystal molecules of the liquid crystal layer of the liquid crystal grating structure is parallel to a direction of a transmission axis of the lower polarizer of the display module.

For example, in the divergent mode, the greater the voltage difference between the upper electrodes and the lower electrodes of the liquid crystal grating structure is, the wider an angle range of the light from the backlight source module after the light passes through the liquid crystal grating structure is.

For example, the display device further comprises: a backlight collimation structure, arranged between the liquid crystal grating structure and the backlight source module.

According to the embodiments of the disclosure, a display apparatus comprising the display device as described above is provided.

According to the embodiments of the disclosure, a display method of a display device is provided. The display device includes a backlight source module, a display module and a liquid crystal grating structure, and the liquid crystal grating structure is arranged between the backlight source module and the display module; the display method comprising: determining a display mode of the display device, the display mode being selected from a peep-proof mode and a shared mode; and based on the determined display mode, adjusting a working mode of the liquid crystal grating structure; for the peep-proof mode, the liquid crystal grating structure adopts a non-divergent mode; and for the shared mode, the liquid crystal grating structure adopts a divergent mode.

For example, the liquid crystal grating structure includes: a lower substrate; a plurality of lower electrodes, arranged in parallel to each other and spaced from each other on an upper surface of the lower substrate; a liquid crystal layer, arranged on the lower substrate and the plurality of lower electrodes; an upper substrate, arranged on the liquid crystal layer; and a plurality of upper electrodes, arranged in parallel to each other and spaced from each other on a lower surface of the upper substrate and corresponding to the plurality of lower electrodes in a one-to-one manner. The display method comprises: forming a voltage difference between the upper electrodes and the lower electrodes of the liquid crystal grating structure so as to enable the liquid crystal grating structure to be in the divergent mode; and not forming the voltage difference between the upper electrodes and the lower electrodes of the liquid crystal grating structure so as to enable the liquid crystal grating structure to be in the non-divergent mode.

For example, in the divergent mode, an optical path difference between an electrode region of the liquid crystal grating structure where one of the upper electrodes and one of the lower electrodes are arranged and a non-electrode region of the liquid crystal grating structure where none of the upper electrodes and the lower electrodes is arranged is half of a wavelength of the light from the backlight source module or a sum of half of the wavelength of the light from the backlight source module and integral multiples of the wavelength of the light from the backlight source module.

For example, in the divergent mode, the greater the voltage difference between the upper electrodes and the lower electrodes of the liquid crystal grating structure is, the wider an angle range of the light from the backlight source module after the light passes through the liquid crystal grating structure is.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 2 (*b*) is a structural schematic diagram of a liquid crystal grating structure of the display device according to the embodiments of the present disclosure;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure disclose a display device. With reference to FIG. 1 to FIG. 4, the display device according to the embodiments of the present disclosure will be described in detail below.

Figure 1:
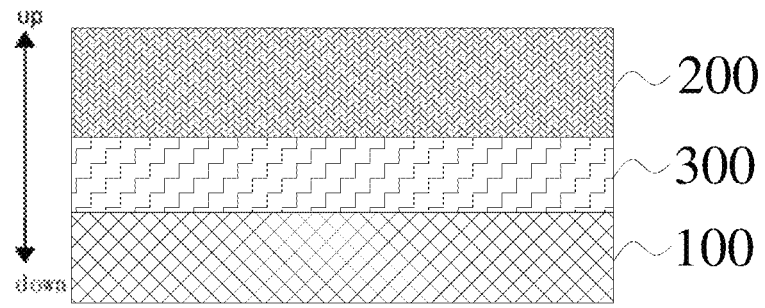
FIG. 1 is a structural schematic diagram of a display device according to embodiments of the present disclosure.

According to the embodiments of the present disclosure, with reference to FIG. 1, the display device includes: a backlight source module 100, a liquid crystal grating structure 300 and a display module 200. For example, the liquid crystal grating structure 300 is arranged between the backlight source module 100 and the display module 200.

For example, the liquid crystal grating structure 300 has a divergent mode and a non-divergent mode. The liquid crystal grating structure 300 in the divergent mode diverges light from the backlight source module 100 to enlarge an irradiation range of the light, so that the display device is in a shared display mode; and the liquid crystal grating structure 300 in the non-divergent mode does not diverge the light from the backlight source module 100 to enable the irradiation range of the light to be unchanged, so that the display device is in a peep-proof display mode.

According to the embodiments of the present disclosure, a structure of the backlight source module 100 is not specially limited, as long as the backlight source module 100 effectively provides backlight for the display module 200. In some embodiments of the present disclosure, the backlight source module 100 adopts a side-lit structure, i.e., the backlight source module includes a light guide plate and a light source arranged at a side edge of the light guide plate. For the backlight source module adopting the side-lit structure, a thickness of the backlight source module is reduced, and energy consumption of the display device is also be reduced. In some embodiments of the present disclosure, the backlight source module 100 adopts a direct-lit structure, i.e., the backlight source module includes the light guide plate and the light source arranged below the light guide plate.

Figure 2A:
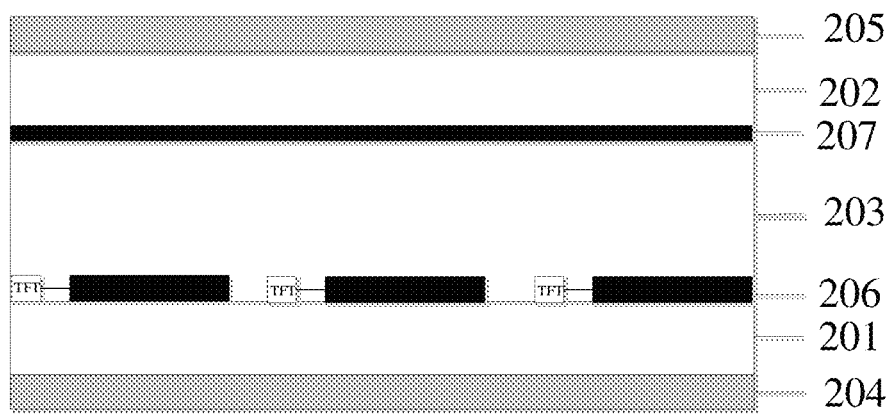
FIG. 2 (*a*) is a structural schematic diagram of a display module of the display device according to the embodiments of the present disclosure.
Figure 2B:
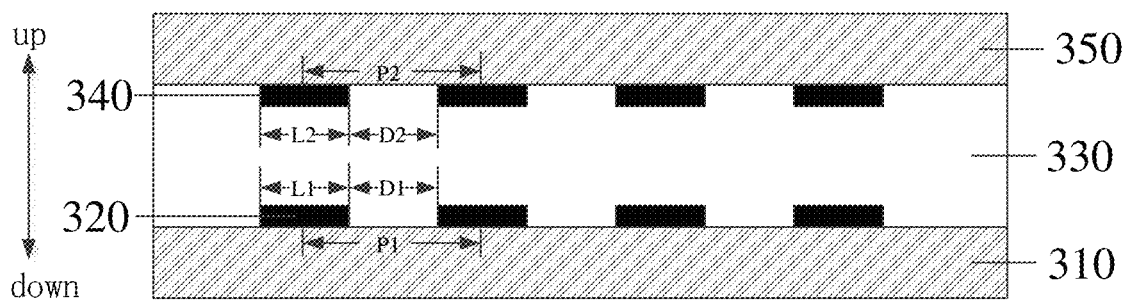

According to the embodiments of the present disclosure, a structure of the display module 200 is not specially limited, as long as the display module effectively enables the display device to have a display function. For example, as shown in FIG. 2 (*a*), the display module 200 includes: an array substrate 201 and an opposed substrate 202 which are arranged oppositely, the array substrate 201 being arranged closer to the liquid crystal grating structure 300 than the opposed substrate 202; a display liquid crystal layer 203 arranged between the array substrate 201 and the opposed substrate 202; a lower polarizer 204 arranged on a side of the array substrate 201, which faces away from the opposed substrate 202; and an upper polarizer 205 arranged on a side of the opposed substrate 202, which faces away from the array substrate 201. For example, an array of Thin Film Transistors (TFTs) is arranged on the array substrate 201. For example, in the display module 200, pixel electrodes 206 respectively connected with the TFTs are arranged on the array substrate 201, a common electrode 207 is arranged on the array substrate 201 and/or the opposed substrate 202, and an electric field is formed between the pixel electrodes 206 and the common electrode 207 to drive liquid crystals in the display liquid crystal layer 203 to deflect so as to implement display.

It should be noted that in FIG. 2 (*a*), illustration is carried out by taking a case that the common electrode 207 is arranged on the opposed substrate 202 as an example; but the embodiments of the present disclosure are not limited thereto. For example, the common electrode 207 is arranged on the array substrate 201. For example, one portion of the common electrode 207 is arranged on the array substrate 201, and the other portion of the common electrode 207 is arranged on the opposed substrate 202.

For example, in FIG. 2 (*a*), illustration is carried out by taking a case that the display module 200 is a liquid crystal display module as an example; but the embodiments of the present disclosure are not limited thereto.

According to the embodiments of the present disclosure, a structure of the liquid crystal grating structure 300 is not specially limited, as long as the liquid crystal grating structure has the divergent mode and the non-divergent mode. In some embodiments of the present disclosure, with reference to FIG. 2, the liquid crystal grating structure 300 sequentially includes a lower substrate 310, a plurality of lower electrodes 320, a liquid crystal layer 330, a plurality of upper electrodes 340 and an upper substrate 350 from bottom to top; the plurality of lower electrodes 320 are arranged in parallel to each other and spaced from each other on an upper surface of the lower substrate 310; the liquid crystal layer 330 is arranged on the lower substrate 310 and the plurality of lower electrodes 320; the upper substrate 350 is arranged on the liquid crystal layer 330; the plurality of upper electrodes 340 are arranged in parallel to each other and spaced from each other on a lower surface of the upper substrate 350; and the plurality of upper electrodes 340 and the plurality of lower electrodes 320 correspond to each other in a one-to-one manner. For example, the lower electrodes 320 and the upper electrodes 340 correspond to each other in the one-to-one manner and are aligned with each other, i.e., a projection of each upper electrode 340 on the lower substrate 310 is completely overlapped with its corresponding lower electrode 320.

For the above-mentioned liquid crystal grating structure 300, in the non-divergent mode, a voltage difference does not exist between the upper electrodes and the lower electrodes, and light from the backlight source module 100 directly passes through the liquid crystal grating structure 300 without being diverged so as to implement the peep-proof display mode of the display device. For the above-mentioned liquid crystal grating structure 300, in the divergent mode, the voltage difference exists between the upper electrodes and the lower electrodes, so that the liquid crystal molecules in an electrode region where one of the upper electrodes and one of the lower electrodes are arranged are deflected by a specific angle, and an emergent angle range of the light from the backlight source module is enlarged, thereby implementing the shared display mode of the display device.

For example, both the lower substrate 310 and the upper substrate 350 are formed by a transparent material. For example, both the upper electrodes 340 and the lower electrodes 320 are formed by a transparent conductive material.

According to the embodiments of the present disclosure, a shape of the lower electrode 320 and a shape of the upper electrode 340 are not specially limited, as long as the lower electrode 320 and the upper electrode 340 are precisely aligned with each other so as to implement deflection of the liquid crystal molecules in a portion of the liquid crystal layer 330, which corresponds to the electrode region where one of the upper electrodes and one of the lower electrodes are arranged. In some embodiments of the present disclosure, both the lower electrode 320 and the upper electrode 340 are strip electrodes. The strip electrode is simple in shape and easy to be fabricated, so that control on the angle range of the emergent light of the display device in a left-and-right direction of a user is easily implemented. For example, extension direction of the strip lower electrode 320 and extension direction of the strip upper electrode 340 are in parallel to edges of the display device, which are respectively positioned on left side and right side of the user.

According to the embodiments of the present disclosure, the plurality of lower electrodes 320 are arranged at equal intervals, and the plurality of upper electrodes 340 are also arranged at equal intervals, i.e., with reference to FIG. 2, a distance D1 between any two adjacent lower electrodes 320 is equal, and a distance D2 between any two adjacent upper electrodes 340 is equal. Therefore, both the strip upper electrodes 340 arranged in parallel to each other and the strip lower electrodes 320 arranged in parallel to each other are arranged at equal intervals, so that precise alignment of each pair of the lower electrode 320 and the upper electrode 340 is ensured. By controlling the voltage difference between the upper electrode 340 and the lower electrode 320, the electrode region of the liquid crystal grating structure 300 where one of the upper electrodes 340 and one of the lower electrodes 320 are arranged and a non-electrode region of the liquid crystal grating structure 300 where none of the upper electrodes 340 and the lower electrodes 320 is arranged show different optical paths, so that the liquid crystal grating structure 300 is equivalent to a grating structure in a state that there is the voltage difference between the upper electrode 340 and the lower electrode 320, and a divergent effect is achieved on light passing through the liquid crystal grating structure 300, thereby implementing the shared display mode.

According to the embodiments of the present disclosure, with reference to FIG. 2, a ratio of a width L1 of the lower electrode 320 to a distance P1 between centers of two adjacent lower electrodes 320 or a ratio of a width L2 of the upper electrode 340 to a distance P2 between centers of two adjacent upper electrodes 320 is called as a duty cycle, and the amount of the duty cycle is not specially limited, as long as the duty cycle enables the liquid crystal grating structure 300 to have the divergent effect on the light from the backlight source module 100 in a state that there is the voltage difference between the upper electrode 340 and the lower electrode 320. In some embodiments of the present disclosure, the duty cycle for example is 50%, i.e., the distance D1 between any two adjacent lower electrodes 320 is equal to the width L1 of any one of the lower electrodes 320, and the distance D2 between any two adjacent upper electrodes 340 is equal to the width L2 of any one of the upper electrodes 340. Therefore, by adopting the electrode arrangement mode with the duty cycle of 50%, the divergent effect of the liquid crystal grating structure 300 is optimal so as to implement the shared display mode better.

According to the embodiments of the present disclosure, voltage signals respectively loaded to the lower electrode 320 and the upper electrode 340 are not specially limited, as long as the voltage signals enable the liquid crystal grating structure 300 to have the divergent effect on the light emitted by the backlight source module 100 in the state that there is the voltage difference between the upper electrode 340 and the lower electrode 320. For example, a voltage loaded to the upper electrode 340 is the same with a voltage applied to the common electrode 270, e.g., a common voltage of 0 V. For example, a voltage loaded to the lower electrode 320 is any voltage enabling the upper electrode and the lower electrode to have the voltage difference, e.g., a square wave voltage of ±Vop. By controlling the upper electrode and the lower electrode to have the voltage difference, the electrode region and the non-electrode region of the liquid crystal layer 330 show different optical paths, so that the liquid crystal grating structure 300 achieves the divergent effect.

For example, the greater the voltage difference between the upper electrode 340 and the lower electrode 320 is, the wider the angle range of the light from the backlight source module 100 after the light passes through the liquid crystal grating structure 300 in the divergent mode is, and the better the divergent effect is.

According to the embodiments of the present disclosure, a pitch of the lower electrodes 320 (i.e., the distance P1 between the centers of any two adjacent lower electrodes 320) and a pitch of the upper electrodes 340 (i.e., the distance between the centers of any two adjacent upper electrodes 340) are not specially limited, as long as these pitches enable the liquid crystal grating structure 300 to have the divergent effect on the light emitted by the backlight source module 100 in the state that there is the voltage difference between the upper electrode 340 and the lower electrode 320. In some embodiments of the present disclosure, the pitch of the lower electrodes 320 of the liquid crystal grating structure 300 and the pitch of the upper electrodes 340 of the liquid crystal grating structure 300 is 1.5 to 3.5 micrometers. The liquid crystal grating structure 300 adopting the above pitch range has the good divergent effect on visible light in the state that there is the voltage difference between the upper electrode and the lower electrode so as to effectively implement the shared display mode. For example, the pitch of the lower electrodes 320 of the liquid crystal grating structure 300 and the pitch of the upper electrodes 340 of the liquid crystal grating structure 300 is 1.5 micrometers; therefore, the liquid crystal grating structure 300, in the state that there is the voltage difference between the upper and lower electrodes, has the good divergent effect on visible light with a wavelength range of 380 to 760 nm so as to effectively implement the shared display mode.

According to the embodiments of the present disclosure, a thickness of the liquid crystal grating structure 300 is not specially limited, as long as the thickness enables the liquid crystal grating structure 300 to have the divergent effect on the light emitted by the backlight source module 100 in the state that there is the voltage difference between the upper and lower electrodes. In some embodiments of the present disclosure, the thickness of the liquid crystal grating structure 300 needs to satisfy that: in the state that there is the voltage difference between the upper and lower electrodes, an optical path difference between the electrode region of the liquid crystal grating structure 300 where one of the upper electrodes and one of the lower electrodes are arranged and the non-electrode region of the liquid crystal grating structure 300 where none of the upper electrodes and the lower electrodes is arranged, is half of a wavelength of the light from the backlight source module 100 or a sum of half of the wavelength of the light from the backlight source module 100 and integral multiples of the wavelength of the light from the backlight source module 100. Therefore, in the case that the liquid crystal grating structure 300 adopting the above thickness is in the state that there is the voltage difference between the upper and lower electrodes, light passing through the grating structure 300 is diffracted, so that the divergent effect of the light from the backlight source module 100 is better.

According to the embodiments of the present disclosure, a material of the liquid crystal layer 330 is not specially limited, as long as the liquid crystal material enables the liquid crystal grating structure 300 to have the divergent effect on the light emitted by the backlight source module 100 in the state that there is the voltage difference between the upper and lower electrodes. In some embodiments of the present disclosure, the liquid crystal layer 330 is formed by Electrically Controlled Birefringence (ECB) liquid crystals. Therefore, under the action of the voltage difference between the upper and lower electrodes, the light has the optical path difference when passing through the electrode region and the non-electrode region of the ECB liquid crystal layer, so that the liquid crystal layer equivalently has a grating effect. In some examples of the present disclosure, an extension direction of a long axis of the liquid crystal molecules of the liquid crystal layer 330 is set to be parallel to an extension direction of a transmission axis of the lower polarizer 204 of the display module 200 so as to achieve the divergent effect and the display function.

Figure 3:
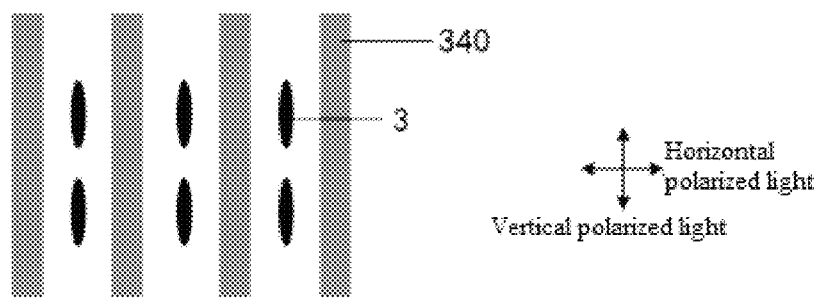
FIG. 3 is a horizontal section schematic diagram of liquid crystals which are positive Electrically Controlled Birefringence (ECB) liquid crystals in a liquid crystal layer of the liquid crystal grating structure of the display device according to the embodiments of the present disclosure in an initial state.

In some examples of the present disclosure, the liquid crystal layer 330 is formed by positive ECB liquid crystals. With reference to FIG. 3, for example, a pre-tilt angle of the liquid crystal molecules 3 in an initial state (i.e., an included angle between the liquid crystal molecules 3 and the substrates 310 and 350 in the initial state) is 0 degree, and the extension direction of the long axis of the liquid crystal molecules 3 is in parallel to the extension directions of the upper electrode 340 and the lower electrode 320. The backlight source module 200 emits natural light, with reference to FIG. 3, it is considered that the natural light consists of a horizontal polarized light and a vertical polarized light, and a light propagation direction is a direction perpendicular to paper. In a state that there is not the voltage difference between the upper and lower electrodes (i.e., in the non-divergent mode), a refractive index of the liquid crystal molecules 3 for the horizontal polarized light is no, and a refractive index of the liquid crystal molecules 3 for the vertical polarized light is ne, the natural light normally transmits the liquid crystal grating structure 300 without being diverged to implement the peep-proof display mode, and at the moment, the liquid crystal grating structure 300 does not have the divergent effect on the light from the backlight source module 200.

In the state that there is the voltage difference between the upper and lower electrodes (i.e., in the divergent mode), the liquid crystal molecules (which are shielded by the upper electrode 340 in FIG. 3) between the upper electrode 340 and the lower electrode 320 is deflected under influence of the electric field, so that the liquid crystals are gradually pricked up and become in parallel to the light propagation direction; and in the non-electrode region where none of the upper electrodes and the lower electrodes is arranged, the liquid crystal molecules are less influenced because there is no electrode, and the liquid crystal molecules 3 are not pricked up apparently and substantially remain in the initial state. At the moment, for the horizontal polarized light, the refractive index of the liquid crystal molecules at each position is no, and the horizontal polarized light normally transmits; for the vertical polarized light, the refractive index of the liquid crystal molecules in the electrode region and in the non-electrode region are different, which is shown as that the optical paths are different; and the liquid crystal layer is equivalent to the grating structure, angle deflection occurs to the vertical polarized light to increase a divergent angle so as to implement the shared display mode. It should be noted that the extension direction of the transmission axis of the lower polarizer of the display device is in parallel to the extension direction of the long axis of the liquid crystal molecules, and thus, the horizontal polarized light cannot transmit through the display device.

Figure 5:
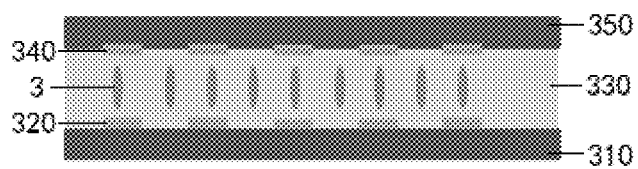
FIG. 5 is a longitudinal section schematic diagram of liquid crystals which are negative ECB liquid crystals in the liquid crystal layer of the liquid crystal grating structure of the display device according to the embodiments of the present disclosure in the initial state.

In some other examples of the present disclosure, the liquid crystal layer 330 is formed by negative ECB liquid crystals. For example, with reference to FIG. 5, the pre-tilt angles of the liquid crystal molecules 3 in the initial state is 90 degrees, the direction of the long axis of the liquid crystal molecules 3 is perpendicular to the extension directions of the upper electrode 340 and the lower electrode 320. In the state that there is not the voltage difference between the upper and lower electrodes (i.e., in the non-divergent mode), the refractive index of the liquid crystal molecules 3 for the horizontal polarized light is no, and the refractive index of the liquid crystal molecules 3 for the vertical polarized light is no, the natural light from the backlight source module 100 normally transmit the liquid crystal grating structure 300 without being diverged so as to implement the peep-proof display mode.

In the state that there is the voltage difference between the upper and lower electrodes (i.e., in the divergent mode), the liquid crystal molecules between the upper electrode 340 and the lower electrode 320 is deflected under influence of the electric field, so that the liquid crystals gradually become horizontal and are perpendicular to the light propagation direction; and in the non-electrode region where none of the upper and lower electrode is arranged, the liquid crystal molecules are less influenced because there is no electrode, and the liquid crystal molecules 3 do not apparently become horizontal and substantially remain in the initial state. At the moment, for the horizontal polarized light, the refractive index of the liquid crystal molecules at each position is no, and the light normally transmits; for the vertical polarized light, the refractive index of the liquid crystal molecules in the electrode region and in the non-electrode region are different, which is shown as that the optical paths are different; and the liquid crystal layer is equivalent to the grating structure, angle deflection occurs to the vertical polarized light to increase the divergent angle so as to implement the shared display mode. It still should be noted that the direction of the transmission axis of the lower polarizer of the display device is in parallel to the direction of the long axis of the liquid crystal molecules, and thus, the horizontal polarized light cannot transmit through the display device.

As described above, the lower substrate 310, the upper substrate 350, the lower electrode 320 and the upper electrode 340 of the liquid crystal grating structure 300 are all formed by the transparent material, and thus, in the state that there is not the voltage difference between the lower electrode 320 and the upper electrode 340, the entire liquid crystal grating structure 300 is transparent and has a first transmittance. In the state that there is the voltage difference between the lower electrode 320 and the upper electrode 340, the entire liquid crystal grating structure 300 is also transparent, i.e., both the electrode region and the non-electrode region of the liquid crystal grating structure 300 are transparent; and at the moment, the liquid crystal grating structure 300 has a second transmittance. The second transmittance is basically the same with the first transmittance. In the state that there is the voltage difference between the lower electrode 320 and the upper electrode 340, light passing through the electrode region of the liquid crystal grating structure 300 and light passing through the non-electrode region of the liquid crystal grating structure 300 have an optical path difference. For example, the optical path difference is half of the wavelength of the light from the backlight source module 100 or the sum of half of the wavelength of the light from the backlight source module 100 and integral multiples of the wavelength of the light from the backlight source module 100.

Figure 4:
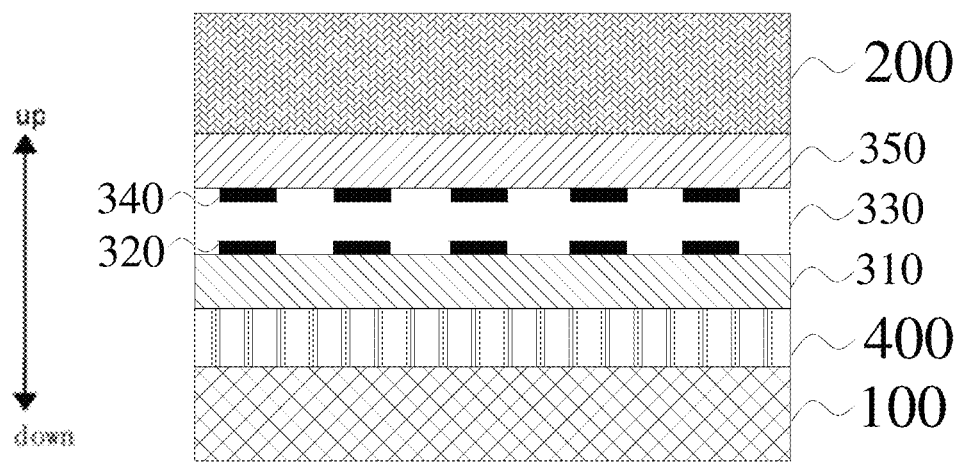
FIG. 4 is another structural schematic diagram of the display device according to the embodiments of the present disclosure.

According to the embodiments of the present disclosure, with reference to FIG. 4, the display device further includes a backlight collimation structure 400, and the backlight collimation structure 400 is arranged between the liquid crystal grating structure 300 and the backlight source module 200. Therefore, after the light from the backlight source module 200 passes through the backlight collimation structure 400, the angle of the light from the backlight source module 200 is defined within a certain small angle range, so that the peep-proof display mode of the display device in the small angle range is implemented better.

According to the embodiments of the present disclosure, a structure of the backlight collimation structure 400 is not specially limited, as long as the backlight collimation structure 400 effectively defines the angle of the light from the backlight source module 200 within the certain small angle range. For example, the backlight collimation structure 400 is a peep-proof film produced by the 3M Company.

According to the embodiments of the present disclosure, the angle range of the light from the backlight source module 200 after passing through the backlight collimation structure 400 is not specially limited. In some embodiments of the present disclosure, after the light from the backlight source module 200 passes through the backlight collimation structure 400, the angle of the light is −30 degrees to 30 degrees. Such design enables the display device to well protect the personal privacy in the peep-proof display mode.

According to the embodiments of the present disclosure, the divergent angle range of the light after passing through the backlight collimation structure 400 and the liquid crystal grating structure in the divergent mode is not specially limited, i.e., a shared angle range of the display device in the shared display mode is designed according to use requirements of the display device. In some embodiments of the present disclosure, the divergent angle range of the light after passing through the backlight collimation structure 400 and the liquid crystal grating structure in the divergent mode is −60 degrees to 60 degrees. Such design enables the display device to well share display information with multiple people in the shared display mode.

According to the embodiments of the present disclosure, a display device is provided, which has a liquid crystal grating structure arranged between the backlight source module and the display module. By carrying out control on the liquid crystal grating structure, switching of the display device between different display modes is implemented, and the display device is simple in switching operation and low in cost and has the potential of industrial mass production.

In another aspect of the present disclosure, the embodiments of the present disclosure disclose a display apparatus. According to the embodiments of the present disclosure, the display apparatus includes the display device. The display apparatus has all the characteristic and advantages of the above-mentioned display device, which are not repeated herein.

According to the embodiments of the present disclosure, the type of the display apparatus is not limited, and the display apparatus may be any device, apparatus and the like capable of achieving the display function. In some embodiments of the present disclosure, the display apparatus for example is a mobile phone, a tablet personal computer, a television, a computer display, a game machine, a wearable device, domestic and household appliances with a display panel and the like.

Those skilled in the art should understand that besides the display device, the display apparatus may further include other necessary components and parts for forming the display apparatus; for example, by taking a mobile phone as an example for illustration, the display apparatus further includes necessary structures and parts for forming the mobile phone, such as a touch screen, a fingerprint identification module, a camera module, a battery, a Central Processing Unit (CPU), a mobile phone housing and the like, and those skilled in the art can select according to a use condition of the specific display apparatus, which is not limited herein.

According to the embodiments of the present disclosure, the display apparatus is disclosed, due to the fact that the display device of the display apparatus is switched between different display modes, types of display modes of the display apparatus are increased, and not only the peep-proof requirement of the user in a private environment is met, but also a shared mode in other occasions is implemented, so that different viewing requirements of the user of the display apparatus are met.

Figure 6:
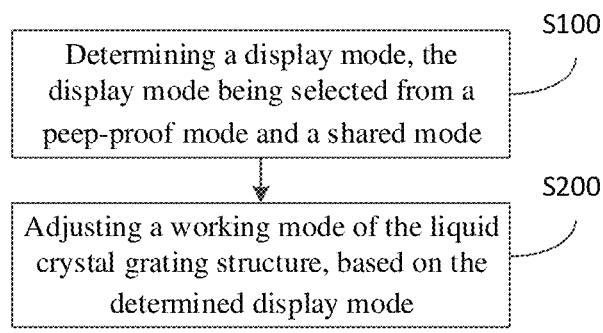
FIG. 6 is a flow schematic diagram of a display method according to the embodiments of the present disclosure.

In yet another aspect of the present disclosure, the embodiments of the present disclosure disclose a display method of a display device. FIG. 6 is a flow schematic diagram of the display method according to the embodiments of the present disclosure. According to the embodiments of the present disclosure, the structure of the display device refers to FIG. 1, the display device includes the backlight source module 100, the display module 200 and the liquid crystal grating structure 300, and the liquid crystal grating structure 300 is arranged between the backlight source module 100 and the display module 200.

According to the embodiments of the present disclosure, with reference to FIG. 6, the display method includes:

S100: determining a display mode, the display mode being selected from a peep-proof mode and a shared mode.

In the step, according to the requirements of the user of the display device, the display mode is determined. For example, in a private environment, the display mode of the display device is selected to be the peep-proof mode, and in other occasions where the display device needs to be shared with many people, the display mode of the display device is selected to be the shared mode.

S200: adjusting a working mode of the liquid crystal grating structure, based on the display mode determined in the step S100.

In the step, according to the display mode determined in the step S100, the working mode of the liquid crystal grating structure 300 of the display device is adjusted so as to implement the peep-proof mode or shared mode of the display device.

In some embodiments of the present disclosure, for the peep-proof mode, the liquid crystal grating structure adopts the non-divergent mode. After light emitted by the backlight source module 100 passes through the backlight collimation structure 400, the divergent angle of the light is defined within a certain small angle range. At the moment, the liquid crystal grating structure 300 is in the non-divergent mode, and then the light still remains within the small angle range after passing through the liquid crystal grating structure 300, so that the peep-proof mode of the display device is implemented.

In some other embodiments of the present disclosure, for the shared mode, the liquid crystal grating structure adopts the divergent mode. The light passing through the backlight collimation structure 400 is in the small angle range, and at the moment, the liquid crystal grating structure 300 adopts the divergent mode and diverges the light into a large angle range, so that the shared mode of the display apparatus is implemented.

According to the embodiments of the present disclosure, adjustment on the working mode of the liquid crystal grating structure is implemented by determining the voltage applied to the liquid crystal grating structure. With reference to FIG. 2, the liquid crystal grating structure 300 sequentially includes the lower substrate 310, the plurality of lower electrodes 320, the liquid crystal layer 330, the plurality of upper electrodes 340 and the upper substrate 350 from bottom to top, the plurality of lower electrodes 320 are arranged in parallel to each other and spaced from each other on the upper surface of the lower substrate 310, the liquid crystal layer 330 is arranged on the lower substrate 310 and the plurality of lower electrodes 320, the upper substrate 350 is arranged on the liquid crystal layer 330, the plurality of upper electrodes 340 are arranged in parallel to each other and spaced from each other on the lower surface of the upper substrate 350, and the plurality of upper electrodes 340 and the plurality of lower electrodes 320 correspond to each other in the one-to-one manner. For the liquid crystal grating structure 300 in the non-divergent mode, the voltage difference does not exist between the upper and lower electrodes, the light from the backlight source module 100 directly passes through the liquid crystal grating structure 300 without being diverged so as to implement the peep-proof display mode of the display device. For the liquid crystal grating structure 300 in the divergent mode, the voltage difference exists between the upper and lower electrodes, so that the liquid crystal molecules in the electrode region where one of the upper electrodes and one of the lower electrodes are arranged are deflected by a specific angle, and the emergent angle range of the light from the backlight source module is enlarged, thereby implementing the shared display mode of the display device.

In some embodiments of the present disclosure, for the shared display mode, the voltage difference between the upper and lower electrodes of the liquid crystal grating structure is sufficient to enable the liquid crystal molecules of the liquid crystal grating structure to be deflected. In some other embodiments of the present disclosure, for the peep-proof mode, the voltage difference between the upper and lower electrodes of the liquid crystal grating structure is zero.

According to the embodiments of the present disclosure, the display method is disclosed. By determining the display mode and adjusting the working mode of the liquid crystal grating structure, the peep-proof mode or the shared mode of the display device is implemented, so that the display device switches its display modes according to different requirements of the user.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Similarly, expressions such as "one", "a/an" or "the" or the like do not denote quantitative limitation, but rather indicate there is at least one. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "up", "down", "left", "right" and the like are only used for expressing relative positional relationship, the relative positional relationship may be correspondingly changed in the case that the absolute position of a described object is changed.

In a case of no mutual conflict, those skilled in the art can carry out integration and combination on different embodiments or examples and the characteristics of different embodiments and examples described in the specification.

The foregoing embodiments merely are exemplary embodiments of the disclosure, and not intended to define the scope of the disclosure, and the scope of the disclosure is determined by the appended claims.

The invention claimed is:

1. A display device, comprising:
   a backlight source module;
   a display module; and
   a liquid crystal grating structure, arranged between the backlight source module and the display module, wherein
   the liquid crystal grating structure includes: a lower substrate; a plurality of lower electrodes, arranged in parallel to each other and spaced from each other on an upper surface of the lower substrate; a liquid crystal layer, arranged on the lower substrate and the plurality of lower electrodes; an upper substrate, arranged on the liquid crystal layer; and a plurality of upper electrodes, arranged in parallel to each other and spaced from each other on a lower surface of the upper substrate and corresponding to the plurality of lower electrodes in a one-to-one manner;
   the liquid crystal grating structure has a divergent mode and a non-divergent mode;
   in the divergent mode, a voltage difference exists between the upper electrodes and the lower electrodes of the liquid crystal grating structure; and
   in the non-divergent mode, the voltage difference does not exist between the upper electrodes and the lower electrodes of the liquid crystal grating structure.

2. The display device according to claim 1, wherein
   in the divergent mode, the liquid crystal grating structure diverges light from the backlight source module, and
   in the non-divergent mode, the liquid crystal grating structure does not diverge the light from the backlight source module.

3. The display device according to claim 1, wherein a distance between any two adjacent lower electrodes is equal, and a distance between any two adjacent upper electrodes is equal.

4. The display device according to claim 3, wherein the distance between any two adjacent lower electrodes is equal to a width of any one of the lower electrodes, and the distance between any two adjacent upper electrodes is equal to a width of any one of the upper electrodes.

5. The display device according to claim 1, wherein a distance between centers of any two adjacent lower electrodes and a distance between centers of any two adjacent upper electrodes are 1.5 to 3.5 micrometers.

6. The display device according to claim 5, wherein the distance between the centers of any two adjacent lower electrodes and the distance between the centers of any two adjacent upper electrodes are 1.5 micrometers.

7. The display device according to claim 1, wherein
   in the divergent mode, an optical path difference between an electrode region of the liquid crystal grating structure where one of the upper electrodes and one of the lower electrodes are arranged and a non-electrode region of the liquid crystal grating structure where none of the upper electrodes and the lower electrodes is arranged is half of a wavelength of the light from the backlight source module or a sum of half of the wavelength of the light from the backlight source module and integral multiples of the wavelength of the light from the backlight source module.

8. The display device according to claim 1, wherein the liquid crystal layer is formed by electrically controlled birefringence liquid crystals.

9. The display device according to claim 1, wherein
   the display module includes: an array substrate and an opposed substrate which are arranged oppositely, the array substrate being arranged closer to the liquid crystal grating structure than the opposed substrate; a display liquid crystal layer arranged between the array substrate and the opposed substrate; a lower polarizer arranged on a side of the array substrate which faces away from the opposed substrate; and an upper polarizer arranged on a side of the opposed substrate which faces away from the array substrate; and
   an extension direction of a long axis of liquid crystal molecules of the liquid crystal layer of the liquid crystal grating structure is parallel to a direction of a transmission axis of the lower polarizer of the display module.

10. The display device according to claim 1, wherein
    in the divergent mode, the greater the voltage difference between the upper electrodes and the lower electrodes of the liquid crystal grating structure is, the wider an angle range of the light from the backlight source module after the light passes through the liquid crystal grating structure is.

11. The display device according to claim 1, further comprising:
    a backlight collimation structure, arranged between the liquid crystal grating structure and the backlight source module.

12. A display apparatus, comprising the display device according to claim 1.

13. A display method of a display device, wherein
    the display device includes a backlight source module, a display module and a liquid crystal grating structure, and the liquid crystal grating structure is arranged between the backlight source module and the display module,
    the display method comprising: determining a display mode of the display device, the display mode being selected from a peep-proof mode and a shared mode; and based on the determined display mode, adjusting a working mode of the liquid crystal grating structure,
    for the peep-proof mode, the liquid crystal grating structure adopts a non-divergent mode,
    for the shared mode, the liquid crystal grating structure adopts a divergent mode,
    the liquid crystal grating structure includes: a lower substrate; a plurality of lower electrodes, arranged in parallel to each other and spaced from each other on an upper surface of the lower substrate; a liquid crystal layer, arranged on the lower substrate and the plurality of lower electrodes; an upper substrate, arranged on the liquid crystal layer; and a plurality of upper electrodes, arranged in parallel to each other and spaced from each other on a lower surface of the upper substrate and corresponding to the plurality of lower electrodes in a one-to-one manner, the display method comprises: forming a voltage difference between the upper electrodes and the lower electrodes of the liquid crystal grating structure so as to enable the liquid crystal grating structure to be in the divergent mode; and not forming the voltage difference between the upper electrodes and the lower electrodes of the liquid crystal grating structure so as to enable the liquid crystal grating structure to be in the non-divergent mode.

14. The display method according to claim 13, wherein in the divergent mode, an optical path difference between an electrode region of the liquid crystal grating structure where one of the upper electrodes and one of the lower electrodes are arranged and a non-electrode region of the liquid crystal grating structure where none of the upper electrodes and the lower electrodes is arranged is half of a wavelength of the light from the backlight source module or a sum of half of the wavelength of the light from the backlight source module and integral multiples of the wavelength of the light from the backlight source module.

15. The display method according to claim 13, wherein in the divergent mode, the greater the voltage difference between the upper electrodes and the lower electrodes of the liquid crystal grating structure is, the wider an angle range of the light from the backlight source module after the light passes through the liquid crystal grating structure is.

16. The display device according to claim 1, wherein a distance between any two adjacent lower electrodes is equal to a distance between any two adjacent upper electrodes.

17. The display device according to claim 1, wherein a width of any one of the lower electrodes is equal to a width of any one of the upper electrodes.

* * * * *